May 13, 1924.
W. J. H. KAPPE
1,493,818
CHAIN SLACK ADJUSTER
Filed May 17, 1921
Fig.1.
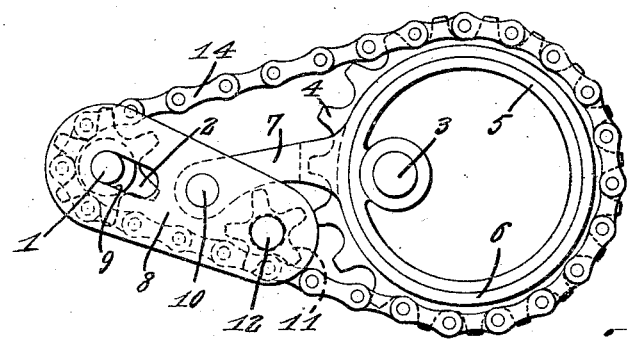
Fig.4.
Fig.2.
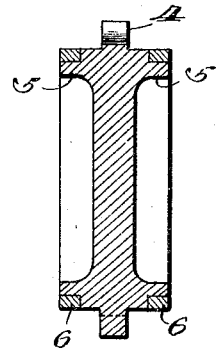
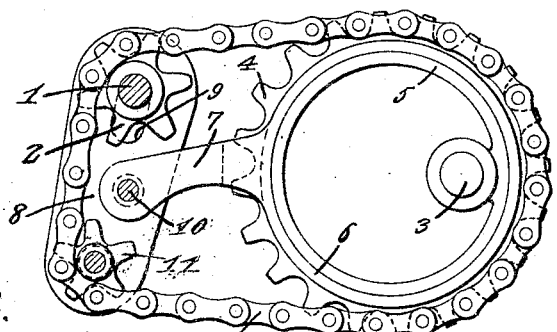
Fig.3.
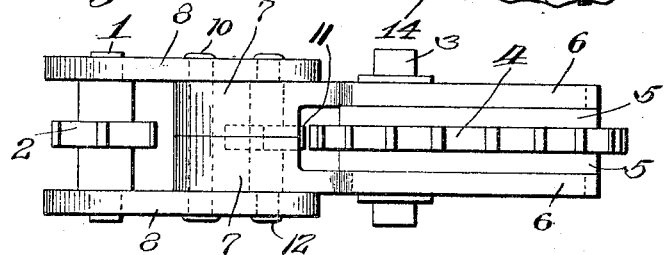
Inventor
W.J.H.Kappe.
By CKnow Co.
Attorneys Patented May 13, 1924.

1,493,818

UNITED STATES PATENT OFFICE.

WILLIAM J. H. KAPPE, OF LOS ANGELES, CALIFORNIA.

CHAIN-SLACK ADJUSTER.

Application filed May 17, 1921. Serial No. 470,426.

*To all whom it may concern:*

Be it known that I, WILLIAM J. H. KAPPE, a citizen of the United States, residing at Los Angeles, in the county of Los Angeles and State of California, have invented new and useful Chain-Slack Adjusters, of which the following is a specification.

This invention aims to provide novel means whereby the slack may be taken automatically out of a sprocket chain which forms a driving connection between two sprocket wheels, when one of the sprocket wheels is mounted eccentrically.

In the drawings: Figure 1 shows in elevation, a device constructed in accordance with the invention; Figure 2 is an elevation wherein the parts have been shifted from the position of Figure 1, parts being removed; Figure 3 is a top plan, the drive chain being omitted; Figure 4 is a transverse section taken through one of the sprocket wheels and attendant parts.

The numeral 1 marks a first shaft whereunto a rotatable member 2, in the form of a first sprocket wheel, is fixed, the sprocket wheel being mounted concentrically with respect to the shaft. The numeral 3 designates a second shaft. A rotatable member 4 is journaled upon or mounted to move with the shaft 3 and may be in the form of a second sprocket wheel disposed eccentrically with respect to the shaft 3. The second sprocket wheel 4 has eccentrics 5 engaged by the straps 6 of a connecting member 7. A two-part radius arm 8 is provided and has elongated slots 9 receiving the shaft 1, the radius arm thus being mounted to swing on the said shaft. Intermediate its ends, the radius arm 8 carries a pivot element 10, upon which the connecting member 7 is mounted. Adjacent to its outer end, the radius arm 8 carries a shaft 12 supporting a guide 11, which may be in the form of a sprocket wheel. About the sprocket wheels 2, 4 and 11 is trained a flexible element, for instance a sprocket chain 14.

For example, rotation may be imparted to the second sprocket wheel 4 from the first sprocket wheel 2 by the chain 14, the eccentrics 5 cooperating with the straps 6 to operate the connecting member 7, swinging movement being imparted to the radius arm 8, and the guide 11 serving to take care of the slack in the chain 14 when the second sprocket wheel 4 moves between its extreme positions of eccentricity, as shown in Figures 1 and 2.

I claim:—

In a device of the class described, a first member mounted for rotation concentrically with respect to an axis, a second member mounted for eccentric rotation and having an eccentric, a connecting member provided with a strap cooperating with the eccentric, the connecting member projecting from the strap toward the first rotatable member and located between the runs of the flexible element, an arm mounted intermediate its ends on the connecting member for swinging movement, one end of the arm being mounted for swinging movement with said axis as a center, and a guide on the other end of the arm and cooperating with one run of the flexible element.

WILLIAM J. H. KAPPE.